W. H. BARTELS.

Assignor, by mesne Assignments, to HEMINGRAY GLASS Co.

Oil-Can.

No. 8,600. Reissued Feb. 25, 1879.

Attest.

Jno. W. Strehli

E. R. Hill.

Inventor.

Wm. H. Bartels, per Wm. Hubbell Fisher,

Atty.

N. PETERS, PHOTO-LITHOGRAPHER, WASHINGTON, D. C.

UNITED STATES PATENT OFFICE.

WILLIAM H. BARTELS, OF ELGIN, ILLINOIS, ASSIGNOR, BY MESNE ASSIGNMENTS, TO HEMINGRAY GLASS COMPANY.

IMPROVEMENT IN OIL-CANS.

Specification forming part of Letters Patent No. 189,682, dated April 17, 1877; Reissue No. 8,600, dated February 25, 1879; application filed October 29, 1878.

*To all whom it may concern:*

Be it known that I, WILLIAM H. BARTELS, of Elgin, in the county of Kane and State of Illinois, have invented a new and valuable Improvement in Oil-Cans; and I do hereby declare that the following is a full, clear, and exact description of the construction and operation of the same, reference being had to the annexed drawings, making a part of the specification, and to the letters and figures of reference thereon.

Figure 1:
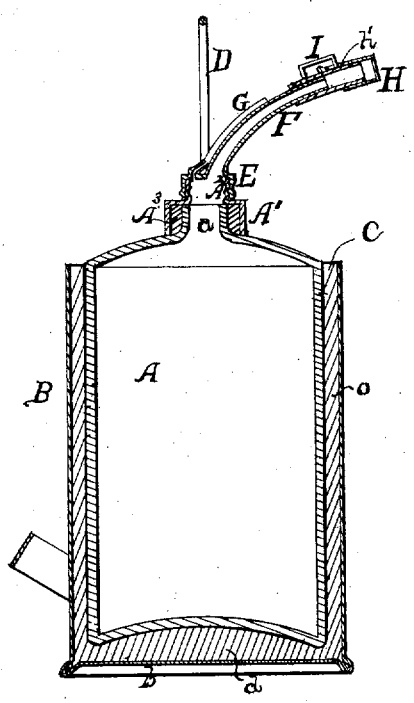
Figure 2:
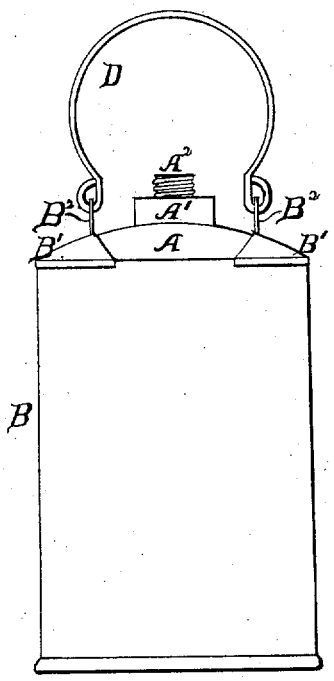

Figure 1 of the drawings is a representation of a central vertical section of my oil-can, and Fig. 2 a side view of the can.

This invention has relation to cans for holding oils, chemicals, &c.; and the novelty consists in the construction of the parts, as will be hereinafter more fully set forth, and pointed out in the claims.

In the accompanying drawings, A designates an inner can or bottle, made of material unaffected by the action of acids—as, for example, glass. B is an outer case or receptacle, (preferably of tin,) inclosing the same, a packing of paper, felt, or other soft material being interposed between them. The outer case is set up at the bottom at *b*, to add to its strength. This case or outer cover, B, and the packing C prevents the can from being fractured or injured, and no corrosion due to the atmosphere or the contents of said can will eat through it—glass, pottery-ware, porcelain, &c., being unaffected by almost all acids.

The case or envelope B is partly open at the top, having there two top pieces, $B^1$ $B^1$, arranged opposite to each other, as shown in Fig. 2. The pieces $B^1$ $B^1$ are provided with vertical, or nearly vertical, lugs $B^2$ $B^2$, in which a bail, D, is pivoted.

It will be seen that by the employment of the casing B, having a bottom packing, *d*, and a side packing, *o*, the bottle or can A is securely held in place from any lateral displacement, while the top pieces, $B^1$ $B^1$, prevent any vertical displacement of the bottle or can.

The neck *a* of the bottle or can is surrounded by a metal ring, $A^1$, provided with a screw-threaded extension, $A^2$, and secured to said neck *a* by an interposed layer of plaster-of-paris, $A^3$, or other adhesive substance. On the extension $A^2$ is secured the threaded cap E, provided with an outlet-tube, F, and an air-tube, G. Outlet-tube F is provided with a cap, H, having a slot, *h'*, which allows it to slide backward and forward upon a staple, I, secured to the top of the outlet-tube.

When chemicals are to be contained in the bottle or can A, it will often be convenient to make the cap E and the parts $A^1$ and $A^2$ of the same material as the can, or to dispense with the two latter parts, forming screw-threads in the outside of the neck of the can or bottle. This construction prevents injury to any of said parts by the action of acids.

What I claim as my invention is—

1. The casing B, having on opposite sides of the neck the top pieces, $B^1$ $B^1$, separated from each other and provided with lugs $B^2$ $B^2$, for the attachment of a bail, in combination with a can having an interposed packing, substantially as shown, and for the purposes set forth.

2. A can, in combination with the casing B, having on opposite sides of the neck of the can the pieces $B^1$ $B^1$, separated from each other and provided with lugs $B^2$ $B^2$, substantially as shown, and for the purposes set forth.

3. The pieces $B^1$ $B^1$, separated from each other, attached to the casing B, bent over the can A, and provided with lugs for the attachment of the bail, substantially as and for the purposes specified.

In testimony that I claim the above I have hereunto subscribed my name in the presence of two witnesses.

W. H. BARTELS.

Witnesses:
JOHN P. SACKSTEDER,
N. W. WARFIELD.